United States Patent
Clift et al.

[15] 3,636,550
[45] Jan. 18, 1972

[54] MAGNETIC WHEEL WITH ROTOR POSITION SENSOR

[72] Inventors: Charles E. Clift; David G. Evans, both of Phoenix, Ariz.

[73] Assignee: Sperry Rand Corporation

[22] Filed: Dec. 19, 1969

[21] Appl. No.: 886,616

[52] U.S. Cl. ......................... 340/319, 340/174.1 H, 340/317
[51] Int. Cl. ............................................................ G08c 19/20
[58] Field of Search ................ 340/187, 317, 324, 325, 196, 340/197, 373; 318/468, 653; 310/168, 156

[56] References Cited

UNITED STATES PATENTS

| | | | |
|---|---|---|---|
| 3,118,138 | 1/1964 | Milas et al. | 340/325 X |
| 3,176,241 | 3/1965 | Hogan et al. | 340/196 X |
| 3,416,015 | 12/1968 | Ordas | 310/156 X |
| 2,827,626 | 3/1958 | Motte | 340/324 X |
| 3,170,150 | 2/1965 | Kelar et al. | 340/197 |
| 3,530,461 | 9/1970 | Steinberg | 340/324 X |

*Primary Examiner*—Thomas B. Habecker
*Attorney*—S. C. Yeaton

[57] ABSTRACT

A unique magnetic circuit in a magnetic rotor position sensor couples the change of the periodically generated DC magnetic flux in a command coil to an interrogating coil.

11 Claims, 8 Drawing Figures

PATENTED JAN 18 1972
3,636,550
SHEET 1 OF 4
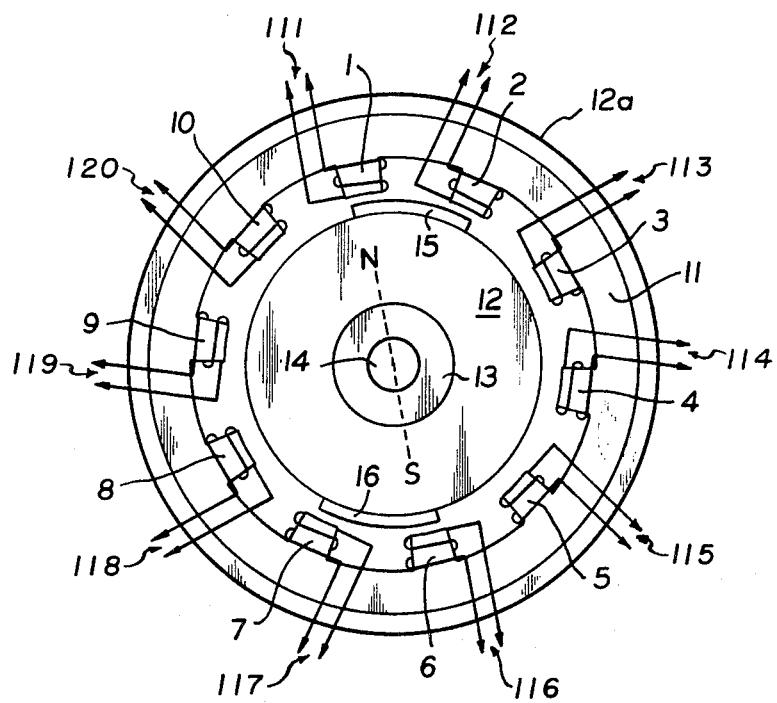
Fig. 1
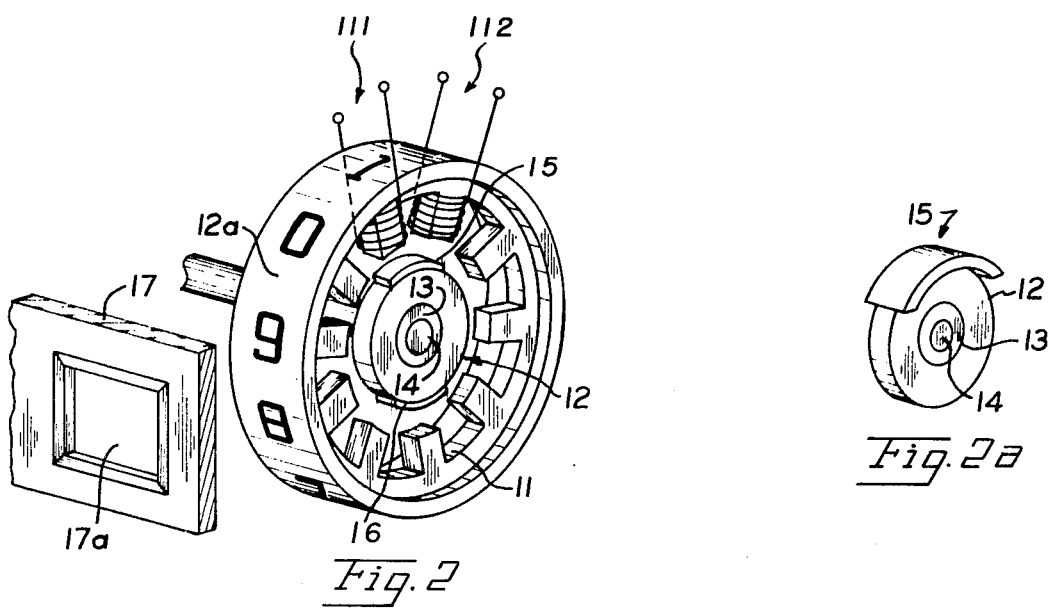
Fig. 2
Fig. 2a
INVENTORS
CHARLES E. CLIFT
DAVID G. EVANS
BY
*H.P. Terry*
ATTORNEY

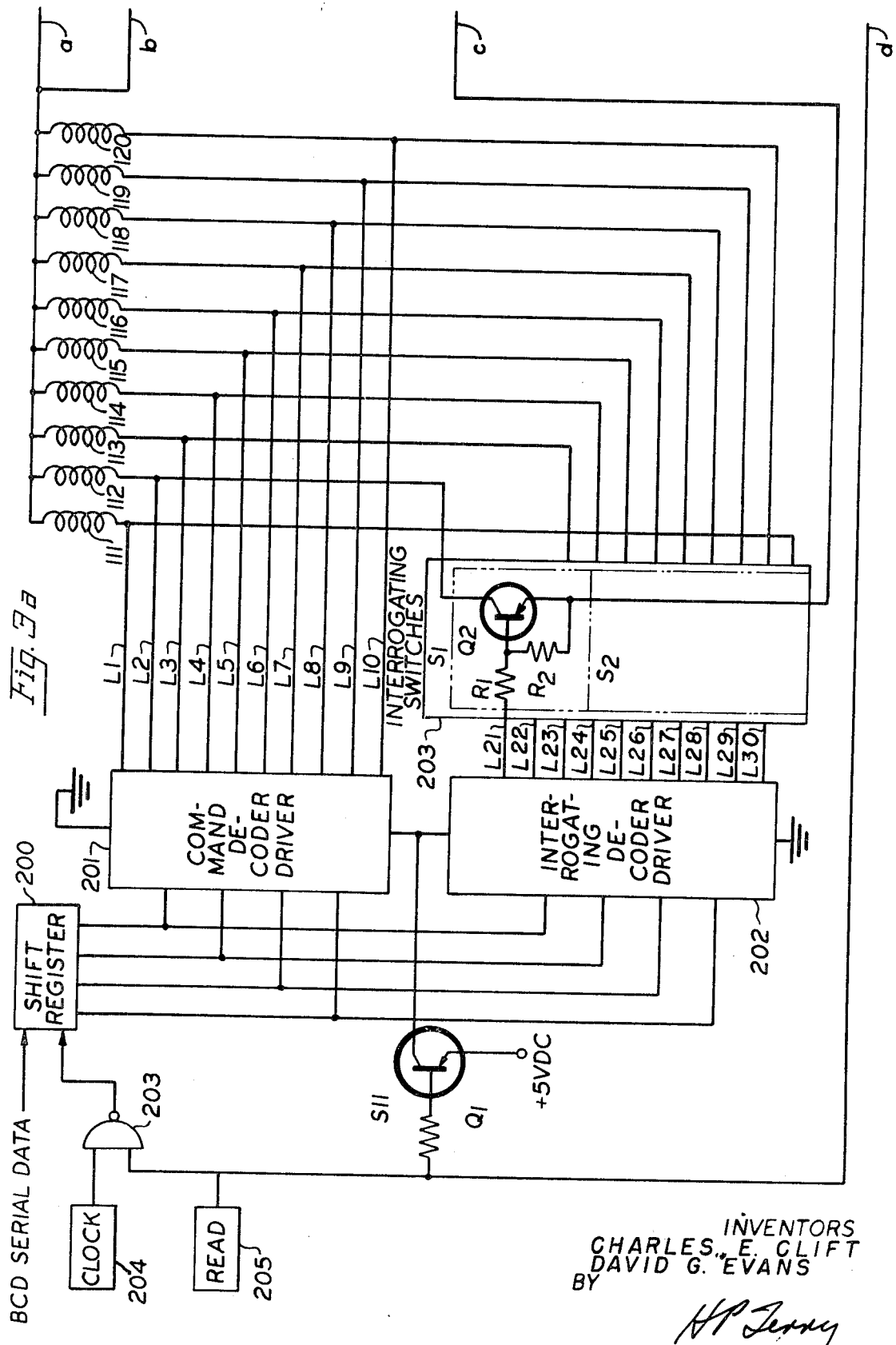

MAGNETIC WHEEL WITH ROTOR POSITION SENSOR

BACKGROUND OF THE INVENTION

1. Field of the Invention

The instant invention relates to a position-determining system for a magnetic rotor indicator wherein the wheel is electronically interrogated during the command pulses. The interrogating pulse provides an indication of whether the rotor is at the desired point of rotation.

2. Description of the Prior Art

The mode of operation of a magnetic rotor indicator can be briefly described as follows. The rotor may be comprised of a magnet rotatably mounted on a shaft, and has attached thereto and extending radially therefrom, a display wheel of specified indicia. The stator comprises several coils corresponding in position to the indicia on the display wheel. By suitable electrical means a selected one of the coils is activated causing the magnet and display wheel to rotate until the appropriate pole of the magnet is in line with the commanded coil. A housing for this combination contains an aperture through which the desired indicium corresponding to the commanded coil is viewable.

This system is generally reliable but does not provide any means for ascertaining whether the displayed indicium is in fact the desired indicium. It is possible for the bearings to hang up or for one or more coils to malfunction and yet have the wheel active for some inputs. As long as the wheel at least appears to be functioning, the viewer cannot determine that it does not respond to each and every position change. This deficiency becomes of major importance when the wheel is in a bank of wheels to provide primary display information such as course or altitude information in a flight instrument. The addition of mechanical linkages for use in adjusting or testing the wheel destroys its mobility advantages of not requiring any contact with exterior parts other than a bearing.

SUMMARY OF THE INVENTION

The instant invention incorporates the general features of the magnetic wheel indicator but has one all important additional construction feature. The physical addition is that of a small highly permeable curved strip attached to the approximate center of one of the poles of the magnet. The center of radius of curvature of the strip is at the center of rotation of the magnet, and the strip extends for an arcuate distance somewhat greater than the arcuate distance between two or more adjacent coils on the stator. The highly permeable metallic strip magnetically couples the flux between adjacent coils on the stator.

The coils on the stator are wound such that the pole of the magnet to which the metallic strip is attached is attracted to the stator coils when they are individually pulsed. The coils of the stator are constructed to face the magnetic pole and provide a small air gap therebetween.

In operation, pulses are periodically transmitted to the coils to update the desired magnetic rotor position. The electromagnetic field produced by the pulses is magnetically coupled to a discrete adjacent coil on the stator through the highly permeable metallic strip. When the pulse is initiated, the electromagnetic field grows and creates a short but determinable voltage spike in the adjacent coil. By appropriate electronic circuitry the coil adjacent to the commanded coil is connected to a gating circuit. During the command pulse the gating circuit is closed. The closed gate will then allow any induced voltage on the adjacent coil to pass to a limiter circuit. The limiter circuit is necessary as some voltage is induced in all of the coils but only the adjacent coil, because of the magnetic coupling, will have a relatively substantial voltage. The limiter has a threshold voltage such that all but the desired voltage will be inhibited. If the desired voltage is not present at the specified time period a failure indicator is activated.

In summary, this invention provides a nonambiguous rotor position sensor by utilizing a unique magnetic circuit which conducts the DC and AC magnetic flux generated by DC excitation of a command coil.

A primary object of this invention is to provide a continuous failure monitoring capability for a magnetic indicator wheel.

Another object of the invention is to provide a continuous failure indicator for a magnetic wheel without increasing the required size of the wheel.

Another object of the invention is to provide a continuous failure indicator for a magnetic wheel that is simple in design.

Another object of the invention is to provide a continuous failure indicator for a magnetic wheel that is all electronic without any moving mechanical parts, except for an indicator flag.

Another object of the invention is to provide a continuous failure indicator for a magnetic wheel that does not require a contacting type pickoff.

Another object of the invention is to provide a continuous failure indicator for a magnetic wheel that is highly reliable.

BRIEF DESCRIPTION OF THE DRAWINGS

FIG. 1 illustrates a detailed diagram of the structure of a magnetic rotor wheel indicator assembly.

FIG. 2 is a three-quarter view illustrating the functional relationship between the rotor, magnetic coil, the numerals and the viewing aperture.

FIG. 2a illustrates a modification of the strip.

FIGS. 3a and 3b are detailed diagrams of the electronic circuitry.

DESCRIPTION OF THE PREFERRED EMBODIMENT

Figure 3B:
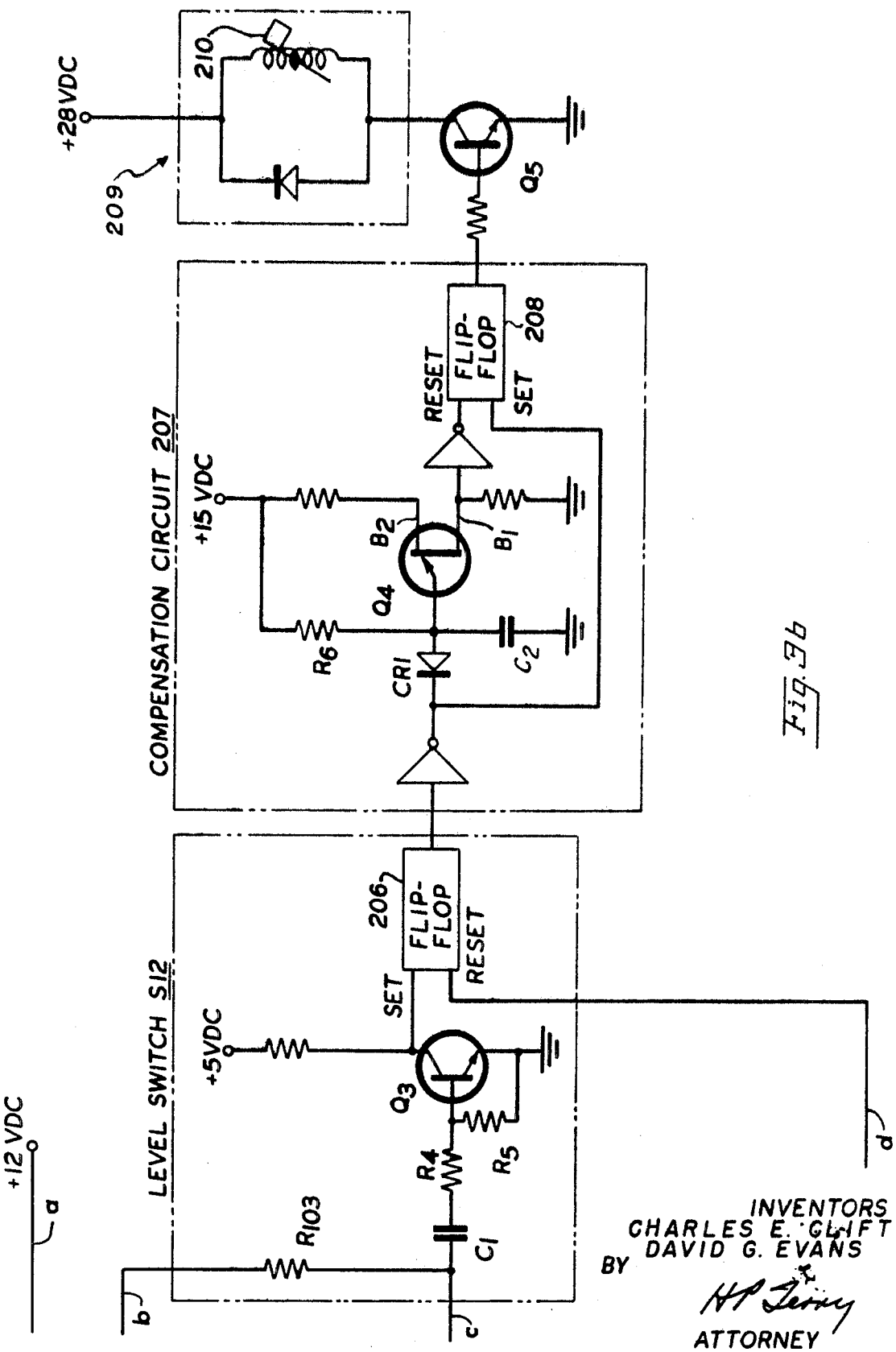

The structure and operation of the magnetic wheel will be described in reference to FIGS. 1, 2 and 2a. The magnet 12 has disposed therein bearing 13 for rotation about the axle 14. Although magnet 12 is referred to as a rotor, its structure is not limited to a circular shape; it may be bar-shaped, rectangular, or of any other configuration. Attached to rotor 12 is a disc having a flange 12a parallel to the axle. The numerals zero through nine or any other desired indicia may appear on the flange 12a. The housing 17 for the magnetic wheel assembly contains an aperture 17a of sufficient size and appropriate location to permit viewing of any of the desired numerals or characters. The stator 11 of the wheel assembly is comprised of ferromagnetic material and constructed as a cylinder. On the inside circumference of the stator 11 there may be disposed a number of spokes, each having an associated coil winding. In the preferred embodiment the number of coils are equal to the number of numerals desired, that is, 10 coils each corresponding to one of the numerals zero through nine. The size of the coils extending inwardly from the inner circumference of the stator is such that there remains a small air gap between the innermost portion of the coil and the magnetic rotor assembly. The size of the air gap is generally determined by the amount of flux desired between the magnet and the coil.

The heart of the invention lies in the highly permeable piece of material 15 disposed on the outer surface of the magnet. The advantage of strip 15 can be succinctly described as follows. When the commanded coil is energized, the change in buildup of the DC magnetic field is not limited to that coil alone and a magnetic field will be induced in each of the coils but of decreasing density in proportion to the physical displacement from the energized coil. The magnetic field buildup will of course, generate a voltage across each of the coils proportional to the rate of change of flux density. However, the difference in voltage magnitude between the coils is very slight and it would be exceedingly difficult and expensive to design and build a limiter circuit S12 to the required tolerances. Further, the variations in response characteristics of the circuit elements themselves are sufficient to cause generator voltage variations greater than those that exist between the coils. Even if the above problem were circumvented, the ensuing system would not provide an unambiguous interrogation. For example, if coil 111 were commanded and coil 112 were interrogated, there would be no difference in output from coil 112 regardless of whether the magnet rotor rotated.

Figure 4A:
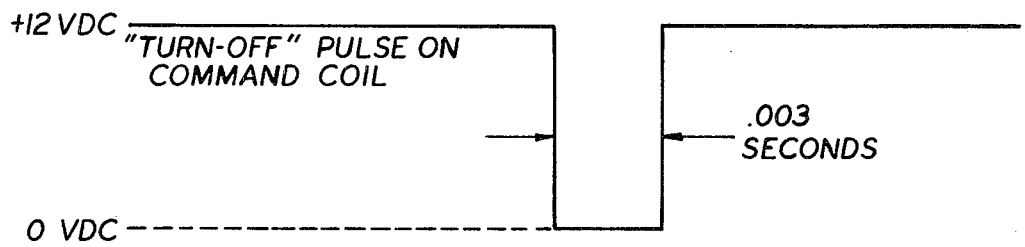
FIGS. 4a, 4b and 4c are diagrams of the command and interrogating pulses.
Figure 4B:
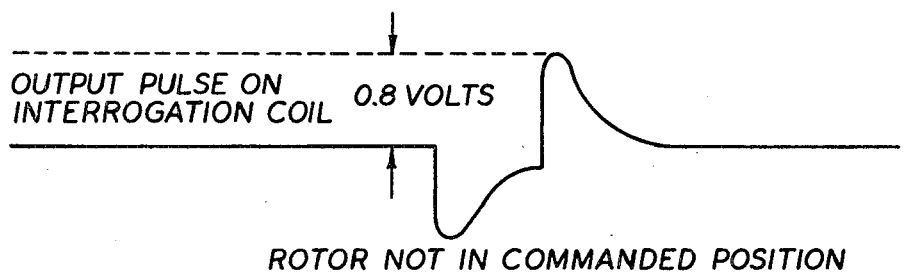
Figure 4C:
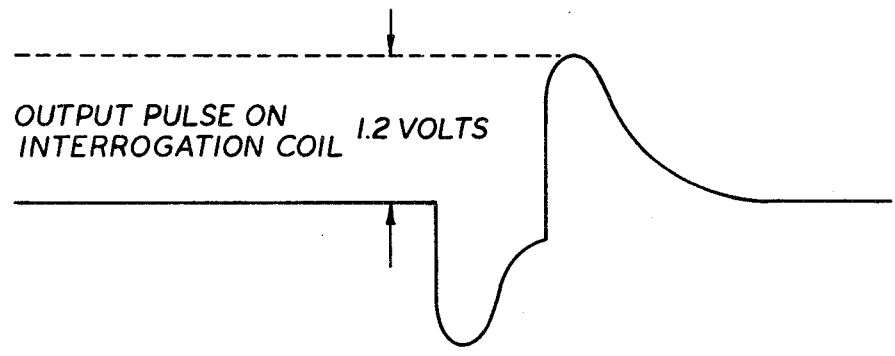

It has been empirically determined that the largest voltage response available on the prototype when the rotor is not in the command position was 0.8 voltage. The response by the interrogating coil when the rotor is in the commanded position rises to a minimum 1.2 volts (see FIGS. 4a, 4b, 4c). This differential in terms of both absolute size and proportion present no problems in determining the electronic component criteria or the parameters of the level switch S12.

The arcuate length of this material 15 has been found to provide the best results if its length is equal to the distance between the centers of two adjacent poles plus 20 percent of the arcuate distance between two adjacent poles. The piece 15 should have its affixed end extend by 10 percent beyond the center of the magnetic pole. The slight overlap will provide a sufficient change of flux coupling to generate the required minimum voltage spike even though the magnetic rotor may be off center by up to one-third of the angle subtended by the indicium. In practice, such a malpositioning has not been found to be objectionable from a viewer's standpoint. The response characteristic of the position sensor may be made more acute by lessening the overlay feature. In one embodiment wherein the wheel diameter was about 1 inch, the thickness of the material should be between 0.006 and 0.010 inch and the width was greater than the width of the magnetic rotor as shown in FIG. 2a, but of course it could be equal to the width of the rotor.

If the strip extends for a distance equal to three or more coils, the system of the present invention will operate satisfactorily but has some disadvantages. It will provide an unambiguous position sensor if the command coil and interrogating coil are related so that they correspond in separation to the length of the strip. The difficulty presented by such an arrangement is twofold. First, the flux density is reduced in comparison to the preferred embodiment and thereby provides a lower difference voltage spike. The difference in size between the voltage spike of a coil associated with the strip and one not so associated will be less and therefore require a closer tolerance in the level switch. Secondly, if a malfunction occurs in the electronic circuitry such that the interrogating coil is not the one at the extremity of the strip, but at a position closer to the command coil, the size of the voltage spike will be almost identical to the desired response. Thus, it is possible for the rotor not to rotate to the desired position and yet the interrogating coil will provide a seemingly correct position indication.

In the preferred embodiment, either an incorrect rotor position or an electrical failure in respect to the coil that is interrogating will provide an indication of a faulty rotor position.

It is relatively unimportant whether the piece 15 be disposed adjacent to the North or South pole. The important relationship is that the windings on the coils 111 through 120 be so wound that there will be an attraction between the coils and the pole of the magnet having the piece 15 attached thereto when each of the coils is activated. The mass of the rotating assembly is relatively small and the speed of rotation is relatively slow. However, for optimum performance, the wheel should be balanced and hence the piece 16 should be of nonpermeable material and counterbalance the weight of the piece 15.

In operation, a command pulse will energize one of the coils corresponding to the desired character indication; it will be assumed for explanatory purposes that coil 111 is energized. The DC excitation of command coil 111 will generate a magnetic field about the coil and attract one of the magnet poles. The magnet rotor will then rotate until the attracted pole is aligned with the energized coil. After the rotor has come to rest, a portion of the highly permeable strip 15 will be in the high flux density between the coil 111 and magnet pole. The change in flux on coil 112 will now generate a voltage spike having a minimum value of 1.2 volts. By mesne means, later described, this correctly valued voltage spike will prevent actuation of the fault indicator flag.

In FIG. 3 there is shown an electronic configuration for operating the positioning and failure indicator feature in accordance with the disclosed invention. The wheel positioning intelligence is in serial Binary Coded Decimal (BCD) format and is applied to the shift register. Shift register 200 has one input for the serial BCD format and a second input for the shift commands. The shift register 200 output is connected in parallel to the command-decoder-driver 201 and interrogator-decoder-driver 202. Drivers 201 and 202 convert the BCD input into "one of ten" decimal format. Clock 204 (oriented to word input rate) and read 205 (oriented to information update rate) operate "NAND"-gate 203 and provide the shift commands for the shift register. The read 205 input also controls switch S11, turning off transistor Q1 during read in of serial information and turning Q1 on during display of data, providing a pulsed input to drivers 201 and 202.

The appropriate line L1–L10 and corresponding line L21–30 (i.e., L1 and L21) in response to the input from shift register 200, are grounded within drivers 201 and 202 only when transistor Q1 of switch S11 is on. Each of the other 9 lines in drivers 201 and 202 are open circuited. Each of the lines L1–L10 is connected to one of the coils 111–120. The grounding of line L1 closes the circuit for coil 111 and current will flow through it from the 12 v. DC source to ground, thereby energizing the coil.

Each of lines L21–L30 is connected to one of the switches S1–S10. Each of switches S1–S10 may be of any convenient configuration and not limited to the transistor switch shown. In the switch illustrated, the base of transistor Q2 is connected to line L21 through a current sinking resistor R1. The collector is connected to coil 112. The emitter has a bias resistor R2. Each of the emitters of S1–S10 is connected in parallel to the input of level switch S12.

It is assumed that the coils 111–120 are numbered in a clockwise direction on stator 12 and that the interrogating coil is the coil adjacent in a clockwise direction to the commanded coil. Keeping these assumptions in mind it is noted that each of the switches are to be associated with the interrogating coils and that when coil 111 is commanded, adjacent coil 112 is interrogated.

As previously discussed, the increase in flux in the pole piece for coil 111 resulting from the command pulse will induce an increase in flux on the adjacent poles corresponding increase in voltage induced in its coil. The positioning by the rotor magnet 12 of the strip 15 in the proximity of coils 111 and 112 will greatly increase the induced field about coil 112. The change in field strength will generate a voltage spike on coil 112. As switch S1 is closed at the time the command pulse is initiated, by grounding the base of transistor Q2 through the current sinking resistor R1, line L21 and driver 201, the voltage spike generated on coil 112 will pass through the switch S1. It has been assumed that there is no malfunction in the rotor and the voltage spike will have a value of at least 1.2 volts above the reference voltage. The reference voltage is 12 v. DC and the value of the minimum instantaneous voltage spike appearing on the common output of switches S1–S10 is 13.2 volts. The common output of switches S1–S10 feeds the level switch S12.

Switch S12 may be any general level switch which will inhibit a signal of less than a specified magnitude. The following described switch has been found to be satisfactory. Level switch S12, connected to the common output of switches S1–S10 converts the voltage pulses reference to +12 v. DC into 5 volt logic level pulses referenced to ground. Resistor R103 maintains a constant DC voltage across capacitor C1 to inhibit any erroneous pulses generated by switches S1–S10.

The input pulses from switches S1–S10 are coupled through capacitor C1 to the voltage divider, resistors R4 and R5. The voltage divider and the VBE breakdown voltage of transistor Q3 sets the switching level of transistor Q3 to reject low-amplitude pulses.

The output of level switch S12 provides one of the inputs for flip-flop 206 and the Read 205 provides the second input. In operation, the Read 205 signal will reset the output of flip-flop 206 to "0." The signal from the level switch S12 will set the output of flip-flop 206 to "1" resuming its normal output. A correct output from level switch to flip-flop 208 will provide an output to circuit 207. On receipt of a signal, circuit 207 will provide a signal to transistor Q5 and maintain transistor Q5 in an ON configuration. When transistor Q5 is OFF the monitor flag circuit 209 is open and the spring operated failure indicator will come into view. Circuit 207 is designed to require a discrete time buildup before producing an output due to the time lag between the command pulse to the magnetic rotor and its rotation to the desired position to provide the interrogation pulse. In practice, a time lag of approximately 300 msec. has been found adequate to prevent premature failure indication. In more detail, circuit 207 can be described as follows.

On a failure, the cathode of CR1 and the set input to the flip-flop 208 are at 5v., back biasing CR1 and allowing C2 to charge due to current flow through R6. After 300 msec. (determined from values of R6 and C2) C2 has reached a high enough potential to fire the unijunction transistor Q4 which outputs a positive pulse at base 1 (B1) of the unijunction. This pulse is inverted and applied to the "reset" input of the flip-flop 208 driving its output to a logical "0", turning off Q5 and allowing the spring biased monitor flag 210 to come into view.

When there is no failure, the cathode of CR1 and the "set" input to the flip-flop 208 are grounded, forward biasing CR1, discharging C2 and setting the output of the flip-flop 208 to "1" turning Q5 on. As long as C2 is continually discharged before the 300 msec. time constant, Q4 never fires and Q5 remains on holding the monitor flag 210 out of view.

The invention is not limited to the above circuitry and following are some modifications. The interrogator decoder driver 202 can be deleted without detrimental effect. In such a case the base of transistors Q2 in switches S1–S10 are connected directly to the output of command-decoder driver 201. The circuitry from shift register 200 and switch S11 to driver 202 is also deleted.

Flip-flop 206 in its present configuration will cause the flag 210 to pop into view if there is no output from level switch S12. However, the flag will not be seen if the input serial data (and the Read signal) cease. Thus, the present configuration will only indicate a faulty magnet rotor rotation (or faulty coils). To indicate a failure of either input data, magnet rotor or coils, the flip-flop 206 and its associated Read circuit may be deleted and any output failure from level switch S12 will cause the flag 210 to pop into view.

In the case of multiple magnetic wheels each requires individual circuitry up to and including level switch S12. Additional logic circuitry may be connected between S12 or flip-flop 208 depending on which previously discussed configuration is desired, and common circuit 209 to inhibit a fault indication if one, two, or more magnetic wheels provides an incorrect signal. Any desired logic functions may be incorporated. Additionally, the input of each wheel may be weighted to allow a seemingly correct reading even when one or more of the less significant digit magnetic wheels have an incorrect output.

While the invention has been described in its preferred embodiment, it is to be understood that the words which have been used are words of description rather than limitation and that changes within the purview of the appended claims may be made without departing from the true scope and spirit of the invention in its broader aspects.

We claim:

1. A magnetic wheel position sensor comprising a magnet, a permeable strip attached to one of the magnet poles, a plurality of coils spatially mounted to cooperate with said magnet, first means adapted to energize at least one of said coils causing said magnet and the coil mounting to move relative to each other, said permeable strip being so arranged relative to said magnet pole and coils, as to couple the positioning energy of said energized coil to at least one other of said coils, and second means adapted to interrogate said other coil in response to said positioning energy for monitoring the position of said wheel.

2. The apparatus of claim 1 wherein said magnet has indicia associated therewith, and said coils are at least equal in number to said indicia.

3. A magnetic wheel annunciator comprising a rotor magnet and associated indicia, a stator circumscribing the rotor and having a series of coils individually disposed thereon, and electronic means for selectively energizing the coils causing the magnet and associated indicia to rotate to the selected positions, wherein the improvement comprises
a permeable strip attached to the magnet in the proximity of a magnetic pole and extending in an arcuate distance therefrom,
said distance being such as to couple the positioning energy of said energized coil to at least one other of said coils, and
means for interrogating said other coil.

4. A magnetic wheel positioning and monitoring system comprising
a rotatable magnet having indicia angularly associated therewith,
a stator circumscribing said magnet,
coils positioned on the inside surface of said stator,
first electronic means for selectively energizing one of said coils for correspondingly-positioning said magnet,
a permeable strip attached to one of the magnet poles and extending for an arcuate distance determined by the angular distance between said coils, and
second electronic means responsive to said positioning energy coupled between said energized coil and another of said coils via said strip for monitoring the positioning of said magnet.

5. The apparatus of claim 4 wherein said arcuate length is greater than the arcuate distance between the centers of the energized coil and said other coil.

6. The apparatus of claim 4 wherein:
one end of said permeable strip extends beyond the center of the magnet pole by a factor of one-tenth of the arcuate distance between two adjacent coils, and the total length of said strip is greater than eleven-tenths of the arcuate distance between two adjacent coils.

7. The apparatus of claim 4 wherein the width of said strip is greater than the width of said magnet.

8. The apparatus described in claim 4 wherein
said stator has pole pieces extending radially inward, and said coils are wound on said pole pieces.

9. The apparatus claimed in claim 8 wherein in the commanded position the permeable strip overlaps each said magnet pole center and said other coil center by a factor of one-tenth of the arcuate distance between two adjacent coils.

10. The apparatus claimed in claim 9 wherein
said energized and other coils are adjacent coils.

11. The apparatus as claimed in claim 4 wherein
said first electronic means comprises
a first binary decoder driver, each output connected to a first lead of each of said coils,
a source of DC power mutually connected to a second lead of each said coil,
said second electronic means comprises
a series of electronic gates connected to a second binary decoder driver and to said first lead, said gates activated in selected manner in respect to the activation of said energized coils,
a limiter connected to the gate outputs and feeding a compensating circuit, and
a servo mechanism operable by an absence of signal from said compensating circuit.

* * * * *